May 19, 1936.　　T. A. MITCHELL ET AL　　2,040,867
METHOD OF TREATING ZINC BEARING ORES
AND RECOVERING ZINC OXIDE THEREFROM
Filed Oct. 31, 1932
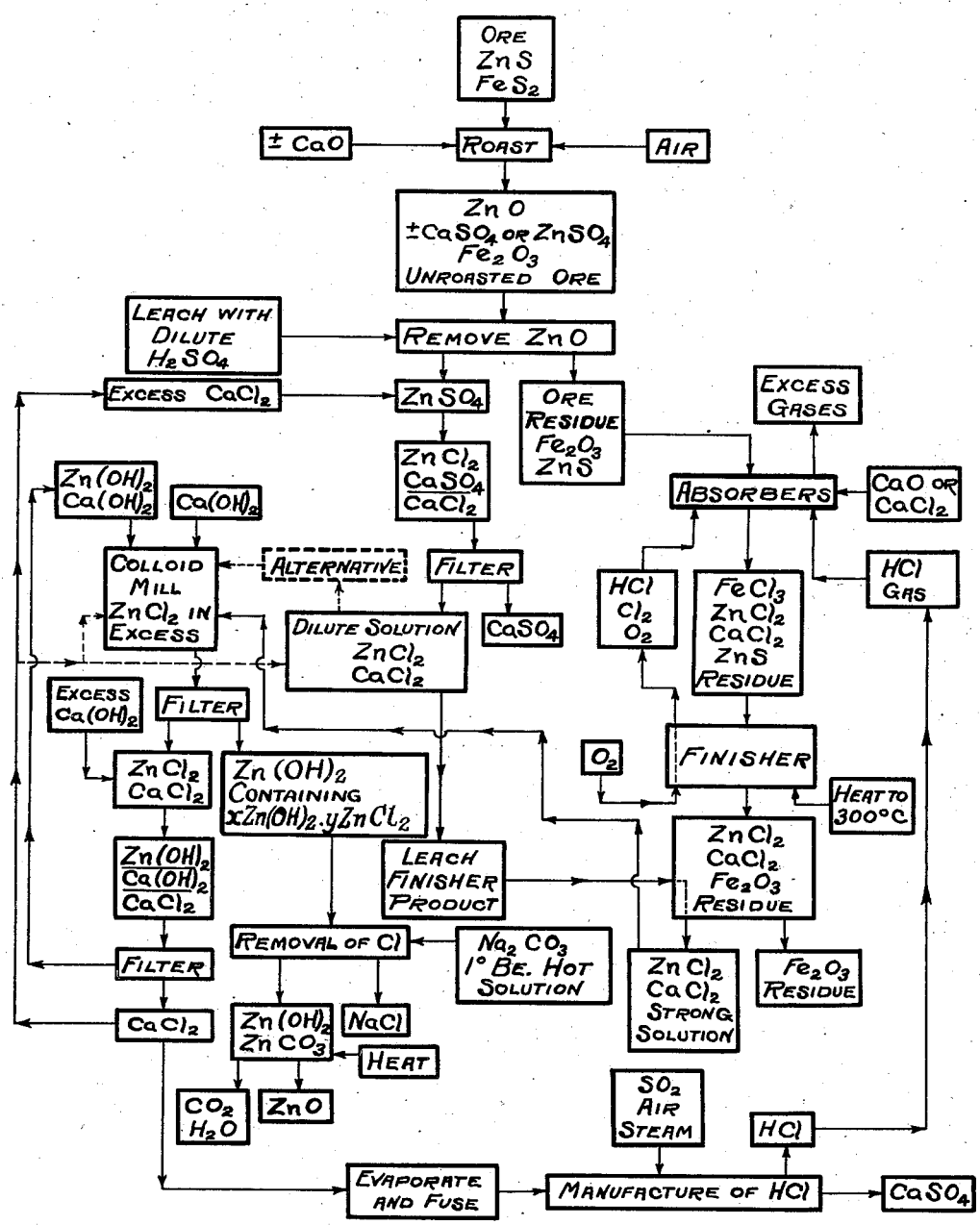
Inventors
THOMAS A. MITCHELL
ROYAL L. SESSIONS
By Clayton L. Jenks
Attorney Patented May 19, 1936

2,040,867

UNITED STATES PATENT OFFICE 2,040,867

METHOD OF TREATING ZINC BEARING ORES AND RECOVERING ZINC OXIDE THEREFROM

Thomas A. Mitchell and Royal L. Sessions, Denver, Colo., assignors, by mesne assignments, to Hughes-Mitchell Processes Incorporated, Denver, Colo., a corporation of Wyoming Application October 31, 1932, Serial No. 640,404

17 Claims. (Cl. 23—147)

This invention relates to the treatment of zinc bearing ores, and more particularly to the recovery of the oxide and hydroxide of zinc from a zinc-bearing ore material, which may be either a raw or particularly treated ore or a product derived therefrom, depending on what type of material is indicated or required for any particular process step.

Zinc occurs commonly in nature as a sulfide or as a carbonate intermixed with compounds of other ore metals, and particularly iron compounds. Various methods have been suggested for obtaining zinc metal and zinc oxide from such zinc ores; but each has its problems. The present invention relates to a hydrometallurgical procedure for treating zinc ore materials and has for one object the production of a commercially pure zinc oxide by a series of steps which may be carried on efficiently and economically.

The invention has for a further object the utilization of the inexpensive alkaline earth metal compounds for converting ore materials to desired recoverable compounds, and more particularly resides in a process in which the alkaline earth metal is employed at various stages of the process as a carrier of chlorine ions and for supplying chlorine for chloridizing the ore metal values as well as for fixing as an insoluble alkaline earth metal sulfate all of the available sulfate radical which would otherwise contaminate the resultant chloride solution with a sulfate of the desired ore metal.

This invention, as herein described, is related to and may employ various steps of the process set forth and claimed in the prior patents describing the Mitchell process, such as Nos. 1,943,331, 1,943,332, 1,943,335, and 1,943,340, in accordance with which the zinc content of a sulfide ore is converted to zinc chloride by roasting the ore and then chloridizing it in a series of steps which involve the use of hydrochloric acid gas to form iron chloride which in turn serves as a source of nascent chlorine. Various procedures may be adopted in which ferric and ferrous chlorides are used as sources of nascent chlorine and hydrochloric acid gas and may be developed from iron sulfide or oxide present in the ore material. As a preliminary step in the present invention, the major portion of the easily recovered zinc content of the roasted ore may be obtained as a sulfate and thereafter converted to the chloride by the reaction of the chloride of calcium, barium or strontium thereon. Various methods may be adopted for this purpose, such as leaching the roasted ore with a dilute solution of sulfuric acid in quantity and concentration adapted to remove the desired amount of zinc oxide, after which the sulfate radical may be removed as an insoluble material by the reaction of the alkaline earth metal chloride on the zinc sulfate in solution. The residue of the ore may be carried through the process of said Mitchell patents or other suitable method, with the resultant formation of a further amount of zinc chloride from the remaining zinc content of the ore material. A further procedure which may be employed for recovering zinc chloride from a roasted pyritic ore involves roasting the ore under suitable conditions and thereafter treating it with sulfur dioxide gas and air in the presence of the iron oxide of the roasted ore, which serves as a catalyzer to provide the sulfate radical, and with an aqueous solution of calcium chloride, which causes the formation of iron chloride. The iron chloride then serves as a source of nascent chlorine or hydrochloric acid for the subsequent chloridization of the ore. In such procedures, an excess of alkaline earth metal chloride is left with the zinc chloride solution in order to insure that no sulfate radical remains therein.

A further object of this invention is to employ such a solution of zinc chloride, containing more or less of alkaline earth metal chloride, as a source of zinc and to convert the same by a series of economical and practical steps to a commercially pure zinc oxide or hydroxide.

Another feature of this invention involves the use of calcium, barium or strontium hydroxide as a reagent for precipitating zinc hydroxide from a zinc chloride solution. A problem has been found in the use of such a reagent, since any excess of the alkaline earth metal hydroxide contaminates the precipitate. On the other hand, an excess of zinc chloride can be made to remove the alkaline earth metal hydroxide, but there still remains in the zinc hydroxide a small amount of a chloride which should be eliminated. A further object of this invention, therefore, resides in the provision of steps of the process which involve the use of such a reagent and yet result in the removal of this contaminating chlorine content of the zinc hydroxide.

In order to precipitate the zinc hydroxide, we preferably employ the alkaline earth metal hydroxide as a thick pulp or paste. It is, however, essential to have sufficient solution present to insure the penetration and reaction of all of the zinc chloride with the reagent; but it is undesirable to employ a dilute solution of zinc chloride for this purpose because of its uneconomical aspects. Nevertheless, the step of leaching a roasted zinc ore with dilute sulfuric acid produces a dilute solution of zinc sulfate, and the subsequent treatment of this dilute solution with a solution of calcium chloride will likewise produce a dilute solution of zinc chloride which cannot be used economically. This problem applies to other methods of producing zinc chloride from an ore, such as where the roasted ore material is treated with a solution of calcium chloride, air and sulfur dioxide gas which react in the presence of iron oxide in the roasted ore, serving as a catalyzer to form zinc chloride, or where the ore is first chloridized, as with hydrochloric acid gas, to form zinc chloride and then leached with water to recover the zinc chloride therefrom, or where the roasted ore is leached directly with hydrochloric acid in dilute solution. As a primary feature of this invention, we so carry on the process as to obtain and utilize a solution of zinc chloride for reaction with the alkaline earth metal hydroxide, which has a high concentration of zinc, alkaline earth metal and chlorine ions, and which is of such a nature as to insure a thorough penetration of the paste by the reagent solution.

One method of accomplishing this invention comprises carrying the ore residue, after the preliminary leaching operation, through a further chloridizing stage and then adding together the zinc chlorides derived from the different steps. To this end, the leached roasted ore residue, which contains zinc sulfide, zinc oxide, zinc ferrate or ferrite, zinc silicate and other materials, may be subjected to the chloridizing treatment of said Mitchell patents, or other suitable methods, to form further zinc chloride in the ore residue, as will be hereinafter more fully described. This residue is then leached with the dilute zinc chloride solution obtained by the initial chloridization of the zinc content of the roasted ore, such as by the sulfuric acid and calcium chloride treatment, so that the concentration of the zinc chloride in the solution is materially increased. Any calcium chloride which remains in the finisher product of the Mitchell process is likewise brought into solution, thus increasing the concentration of the calcium chloride. Various other procedures may be adopted for obtaining a solution containing the desired concentration of zinc, chlorine and alkaline earth metal ions.

As a further feature and in order that the process may be economical, we propose to utilize the excess of calcium chloride derived from this process to form hydrochloric acid gas for treatment of the ore material in accordance with the Mitchell process. For this purpose, the calcium chloride solution as ultimately recovered is evaporated to dryness and preferably fused, and it is then heated in lump form with sulfur dioxide, air and steam, in accordance with the method set forth in the Mitchell Patent No. 1,923,324, dated August 22, 1933, for the production of hydrochloric acid gas. This hydrochloric acid gas is then conducted to the absorber for treating the ore residue. Therefore, in accordance with this procedure, we derive a zinc chloride solution from the roasted ore material by the utilization of chlorine ions furnished by calcium chloride; and the calcium chloride recovered at the end of the process is used to form hydrochloric acid gas, which is in turn employed directly or indirectly to convert residual zinc and iron compounds of the ore to the chlorides. Therefore, the calcium or other alkaline earth metal employed is a primary source of chlorine throughout the process.

The invention will be explained with reference to a zinc sulfide ore, but it will be understood that various sub-combinations of this process may be employed by themselves in the treatment of zinc-bearing materials which are not necessarily or directly derived from a sulfide ore. The invention is equally applicable to a zinc carbonate ore or to zinc and oxygen or chlorine compounds derived from various sources. This process will be more fully understood by reference to the accompanying drawing illustrating diagrammatically the various steps employed in treating a simple zinc and iron sulfide ore, which, however, may be complex in nature and contain various sulfides of other metals, such as copper, lead, and so forth. The invention will also be more fully understood by reference to the following equations which illustrate the essential stages of this process:

1. $ZnO$ (roasted ore) $+ H_2SO_4 = ZnSO_4 + H_2O +$ residue (used in 3)

2. $ZnSO_4 + CaCl_2 = \underline{CaSO_4} + ZnCl_2$ (weak solution)

3. $Fe_2O_3$ (in residue from 1) $+$ $6HCl$ (from 11) $= 2FeCl_3.3H_2O$

4. $4FeCl_3 + 3O_2$ (heat) $= 2Fe_2O_3 + 6Cl_2$

5. Zinc compounds in ore residue $+$ $Cl_2 \rightarrow ZnCl_2$ in finisher product 6. $ZnCl_2$ (solution from 2) $+ ZnCl_2$ (from 5) $=$ $ZnCl_2$ (strong solution)

7. $ZnCl_2$ (in excess) $+ CaCl_2$ (from 8) $+ Ca(OH)_2 =$ $\underline{Zn(OH)_2 xZn(OH)_2.yZnCl_2} + ZnCl_2 + CaCl_2$ 8. $ZnCl_2 + CaCl_2$ (from 7) $+ Ca(OH)_2 = Zn(OH)_2 +$ $\underline{Ca(OH)_2} + CaCl_2$ (strong)

9. $xZn(OH)_2.yZnCl_2 + yNa_2CO_3 =$ $x\ Zn(OH)_2 + 2yNaCl + yZnCO_3$

10. $CaCl_2 +$ evaporation $= CaCl_2$ (anhydrous)

11. $CaCl_2$ (anhydrous) $+ H_2SO_4 = 2HCl + \underline{CaSO_4}$

Referring now to the drawing and to the above equations, it will be understood that an ore containing zinc and iron sulfides is preferably roasted with excess of air so as to form zinc oxide and/or sulfate and to bring the iron into the ferric oxide condition. If desired for certain types of procedure, the iron may be roasted to the ferrous condition and be employed in the process or eliminated in accordance with other methods which need not be specifically herein described. The ore may be roasted with or without the addition of lime, in accordance with the procedure set forth in the Mitchell Patent No. 1,943,331, it being understood that if lime is employed, the zinc will be roasted to zinc oxide and there will be substantially no zinc sulfate present in the roasted material. For this purpose, calcium, strontium or barium oxide is added to the ore in quantity in excess of that sufficient to fix as an insoluble sulfate all of the available sulfate radical which would otherwise combine with zinc and other metals to form an ore metal sulfate. It is preferable to have the alkaline earth material constitute at least 5% of the total weight of ore material so that it may act as a physical barrier between the ore particles and prevent their sintering together, as well as to minimize inter-reactions between the iron and zinc or other compounds in the particles. This roasting operation may be carried on in accordance with standard procedure, but it is preferable that it be carried on autogenously or at as low a temperature as is feasible and under such conditions as will ordinarily prevent the roasted material from becoming a hard, indurate, vitreous or sintered product. It is ordinarily feasible or desirable to leave 4 or 5%, or more, of residual sulfide sulfur in the ore for removal during the subsequent chloridizing stages.

The ore is crushed initially, and preferably to a finely divided condition, and it is intimately mixed with 5 to 10% of lime, if the same is employed, and preferably with the addition of water to insure that the lime is in very close association with the ore material. When the ore is dried prior to the high temperature roasting treatment, the elimination of the water of hydration of the calcium hydrate, as well as the water of crystallization in any calcium sulfate present, will aid in opening up pores and insure that the ore material is in a condition which may be easily penetrated by liquid and gaseous reagents. The roasted product is, therefore, a porous, pulverulent and open product which may be easily treated in the subsequent stages.

If the ore has a high zinc content, then the subsequent treatment of this roasted ore residue with hydrochloric acid gas would produce a considerable amount of water of reaction and, since the zinc chloride is highly deliquescent, the consequent formation of a viscous or syrupy mass due to the zinc chloride going into solution would be likely to coat the ore particles and close the pores and thus hinder the chloridizing step. Hence, a large quantity of the zinc content is leached from the roasted ore prior to the chloridizing steps of the Mitchell process, which is particularly efficient in its treatment of a low-grade ore material, and for this purpose, we may employ various procedures. As illustrated, this may comprise the simple step of leaching the ore material with a required amount of a dilute solution of sulfuric acid, thereby forming zinc sulfate in dilute solution. If desired, we may leave some zinc oxide in the residue.

The residue containing ferric oxide, the residual zinc oxide and the less easily chloridized compounds is then carried on to the Mitchell procedure, in accordance with which it is treated first in an absorber with hydrochloric acid gas, while passing in counterflow or concurrent relation thereto, and preferably under controlled moisture and temperature conditions which insure the formation of iron chloride, and preferably ferric chloride. The latter is capable in turn of reacting directly while in solution to chloridize other ore values. The process is carried on with the roasted ore material in a substantially dry and pulverulent condition, but it may be slightly moist with the water derived from the reaction of hydrochloric acid gas on the ore metal oxides. If the procedure of the Mitchell process is adopted, the ore will be in a pulverulent, substantially dry condition throughout the absorber stage, due to the fact that water of reaction is removed by the air and gas current passed through the apparatus, or to the use of a sufficiently high temperature to insure evaporation of a considerable proportion of the moisture. Moreover, the ferric chloride, as it is formed, takes up water of crystallization under the temperature conditions of the process and so insures the absence of any material amount of free water which would otherwise make the ore wet. The absorber reactions may be carried on in two stages, the first being conducted in a warm absorber where the residual zinc oxide is chloridized. In that apparatus the temperature, such as 80° C., is made sufficiently high to insure the evaporation of enough water for removal by the gas current passed therethrough to keep the ore material substantially dry. The rate of gas flow and the nature of the gases employed may also be regulated. It is preferred to use the residual gases coming from the finisher and the second absorber. In the latter, the iron oxide is converted to the chloride, and for this purpose strong hydrochloric acid gas is introduced, with or without air, and the temperature is maintained below that point at which the iron chloride would be decomposed. A temperature somewhat below 100° C. may be maintained. If desired, for certain types of ore materials, a considerable amount of moisture may be left in the ore material, within the ability of the latter to absorb it and prevent the zinc chloride from forming a syrupy mass.

The finisher stage involves chloridizing the more refractory or less easily treated portions of the ore, and this is accomplished by means of chlorine or hydrochloric acid gas, or both. The preferred procedure involves the provision of nascent chlorine, and this may be derived from ferric chloride or ferrous chloride, which is in intimate association with the ore material, by heat treating the ore mixture with an excess of oxygen at a temperature above the dissociation point of the iron chloride and under controlled moisture conditions, whereby nascent chlorine is formed and the iron remains as ferric oxide. In the presence of a considerable amount of water provided for the purpose, hydrochloric acid gas will be derived from the iron chloride. As shown in the drawing, the material passes in counterflow relation to a current of oxygen and the resultant chloridizing gases, and the product is heated at the end where the air is introduced to a temperature below the volatilizing point of the zinc chloride, but above 100° C., and preferably about 250° C. or 300° C., depending on the nature of the ore being treated.

The gas flow through the reaction chamber is preferably so controlled that the excess of water vapor is removed and the major reaction of the iron chloride, whether present as ferrous or ferric chloride, reacts with oxygen rather than water vapor, and nascent chlorine instead of hydrochloric acid is produced. However, it is within the broader aspects of this invention to produce ferrous chloride from the roasted ore material, as by limiting the oxygen supply or by employing reducing conditions during roasting so as to make ferrous oxide, and by subsequently employing ferrous chloride to produce either chlorine or hydrochloric acid for the chlorodizing process. Any ferrous oxide formed in the final chloridizing process is preferably oxidized to ferric oxide by an excess of oxygen present and will thereby go with the ore residue and not be dissolved in the subsequent leaching operation.

The nascent chlorine, which is thus evolved in intimate association with the ore material, will serve to react with various refractory compounds, such as zinc sulfide, zinc ferrate and ferrite, zinc silicate and the like, and convert the zinc compounds to zinc chloride which remains there in the dry residue ready for the subsequent leaching operation.

At the upper end of the finisher chloridizing chamber, the ore material enters in a substantially cold condition. As it is heated, some of the ferric chloride will dissolve in its water of crystallization, and in solution it is a powerful reagent and capable of directly attacking zinc sulfide and other materials at a low temperature. Hence, a considerable proportion of the chloridizing operation goes on at this low temperature, and prior to the high temperature treatment at the exit end of the finisher chamber. The net result of this finisher procedure is to convert the residual zinc compounds in the ore to zinc chloride.

It will be understood that suitable types of apparatus may be employed, such as long rotary tubes having baffles on their inner surfaces which serve to shower the material through the reagent gases employed. Apparatus of the type of a shelf roaster may also be employed. Suitable heating and cooling devices may also be used to insure correct temperature conditions at the various stages of the chlorodizing treatment. A more detailed description of this procedure will be found in said prior Mitchell patents, and the various features there described may be employed in the present case.

It is feasible to employ other chloridizing procedures than the one above described, and particularly those which involve the use of alkaline earth materials, which result in a solution containing both zinc and calcium chlorides. For example, the roasted ore containing iron and zinc oxides may be mixed with calcium chloride, dry or in solution, and then treated with sulfur dioxide gas derived from a suitable source and with steam or water and air, in accordance with which the sulfur dioxide is converted to sulfuric acid by catalytic agents, such as ferric oxide, which may be present; and this sulfuric acid reacts with the calcium chloride to form hydrochloric acid and thus makes the chloride ion available for reacting with zinc compounds in the roasted ore material. This results in the direct formation of zinc chloride and the elimination of the sulfate radical as insoluble calcium sulfate. A solution of zinc chloride as derived from the ore thus treated will contain an excess of calcium chloride, which is a desired reagent in the subsequent steps of the process.

If the zinc oxide has been leached from the roasted ore, as first described, by means of dilute sulfuric acid of suitable concentration, this results in a dilute solution of zinc sulfate. The next step, as shown on the drawing, involves its conversion to zinc chloride, and preferably by means of an excess of calcium chloride, thus forming a solution containing zinc chloride and calcium chloride, the sulfate radical being eliminated as insoluble calcium sulfate. It will be understood that any reference to calcium herein will refer to barium and strontium as well, since any alkaline earth material may be employed which will fix the available sulfate radical as an insoluble sulfate.

As a result of treating the roasted ore with sulfuric acid and calcium chloride by either of the above described processes, we have a dilute solution of zinc and calcium chlorides. It is desirable, as above explained, to employ a concentrated solution. This dilute solution may be concentrated by various methods, but it is preferable to employ it to leach the finally chloridized finisher product, as above described, and thereby dissolve such zinc chloride and calcium chloride as may be present therein. In the finisher chloridizing process, it is preferable to carry on the reactions in the presence of calcium or other alkaline earth metal chloride which is capable of and is present in amount sufficient for fixing all of the available sulfate radical as an insoluble sulfate. Any excess of calcium chloride which is present will, therefore, go with the zinc chloride into solution when the finisher product is leached. By suitable manipulation of this leaching stage of the process, we may now obtain a strong solution of zinc chloride and sufficient calcium chloride to render the subsequent steps of the process economical.

The next step involves converting the zinc chloride in solution to zinc hydroxide, and this is preferably accomplished by means of calcium hydroxide which is employed as a thick pulp or paste. Owing to the fact that the reagent is a solid, it is desirable to have a considerable quantity of liquid present to provide a pulp of proper consistency and to insure the complete elimination of the calcium hydroxide in this process. We propose to use a strong aqueous solution of calcium chloride rather than water for this purpose, and we thereby provide a high concentration of chloride ion for the process, as well as make it feasible to recover a strong solution of calcium chloride, after the zinc has been precipitated, which may be economically used in other stages of the process, and thus minimize the expense of concentration and evaporation steps.

Our research has disclosed that this reaction of zinc chloride on calcium hydroxide proceeds to a complete elimination of the calcium hydroxide if an excess of zinc chloride is present. Hence, this step is so carried on as to insure intimate mixing and a complete reaction of the ingredients. If the calcium hydrate were used as a solution, then ordinary agitation would be sufficient; but we preferably employ the slaked lime as a thick pulp or paste and utilize a colloid mill of standard construction for the purpose of bringing the zinc chloride solution into intimate association with the calcium hydrate. This milling of the materials is carried on for a sufficient length of time and, if desired, with the aid of heat to insure the conversion of substantially all of the calcium hydrate to calcium chloride and the resultant formation of zinc hydroxide and a small amount of zinc hydroxychloride contaminating the same. If the operation in the colloid mill is carried on properly, there will be not over 0.1% of calcium hydroxide present in the resultant product and the amount of zinc hydroxychloride compounds formed may be as low as 2.4% of combined chloride when the operation is carried on with hot solutions, or it may be as high as 11 or 12% when the operation is carried on in the cold. Normally, we may have 6 or 7% of this contaminating hydroxychloride to be eliminated, and this may be easily cared for in the subsequent stages.

The result of this process is the formation of zinc hydroxide and a little zinc hydroxychloride as a precipitate with the excess of zinc chloride and the calcium chloride in solution. The precipitate is then separated from the solution, and the solution may be then retreated with calcium hydroxide, or slaked lime, used in excess of that amount required to precipitate the remainder of the zinc as the hydroxide. The mixture of zinc and calcium hydroxides thus formed may then be returned to the colloid mill where the excess of calcium hydroxide will be used up. The strong calcium chloride solution which results from this purification step will be filtered from the mixed hydroxides, and if desired, some of it may be used to increase the concentration of chloride ions in the colloid mill, where it is desirable to have the calcium chloride in high concentration. If desired, the solution of zinc and calcium chlorides obtained from the roasted ore may be conducted directly to the colloid mill, without being used to leach the finisher product, and in that case suitable steps will be taken to insure that the solution has an adequate concentration of zinc and/or calcium and chlorine ions.

Owing to the necessity for using an excess of zinc chloride in precipitating the zinc hydroxide, there remains in the precipitate a considerable amount of combined chlorine which is so intimately associated with the hydroxide that it cannot be removed by washing. No matter how long or how well the zinc hydroxide is washed with hot or cold water, there is always some of this fixed chloride in the resulting dry product. The composition of the impurity, herein termed zinc hydroxychloride, has not been determined, but we may consider that it has the formula $xZn(OH)_2.yZnCl_2$. An important step in this process involves the elimination of this combined chloride content of the pulp. The composition of the pulp thus produced varies as to its chloride content, depending upon the concentration of the zinc chloride solution employed and upon the temperature at which it is precipitated. The exact procedure involved in eliminating this chloride content, therefore, depends upon an analysis of the product to determine the chloride content.

Of the various methods which may be employed for eliminating the hydroxychloride which thus contaminates the zinc hydroxide, we preferably treat the pulp with a solution of alkali metal carbonate, and particularly sodium carbonate, which serves to react with the combined chlorine to form sodium chloride solution and leave the zinc content as a chlorine free compound herein termed basic zinc carbonate but without regard to its molecular composition. Our preferred procedure for eliminating the chloride content is to wash the pulp thoroughly with water and then suspend it in a 1° Beaumé solution of sodium carbonate or commercial soda ash. This material is preferably heated and agitated for a considerable length of time with an excess of sodium carbonate until substantially all of the chlorine has gone into solution as sodium chloride. The operation may be carried on by boiling the mixture for thirty minutes or more and, if desired, a colloid mill may be used to insure complete penetration of the zinc hydroxide by the sodium carbonate solution. The pulp, after being well washed, will be found to contain a chloride content of not over 0.3%, which is satisfactory for commercial purposes. The mixture of zinc hydroxide and basic zinc carbonate thus formed by the soda ash treatment may be separated from the sodium chloride solution by filtration, and the solid material may be washed and dried and used as such in various ways or if desired it may be calcined to convert the compounds to zinc oxide.

It will be understood that the sodium carbonate employed in the above reaction may be derived from any suitable source and contain various impurities which are not detrimental to the reaction; and one may employ either the acid or the basic carbonate for the purpose, as well as such commercial products as soda ash or the impure products found in nature. The zinc oxide thus produced is not contaminated with sulfates or with chlorides to any material extent. The product is free from iron. It is, therefore, a commercially pure material and capable of many uses in the industry. It will be understood that other ore metal compounds which may be present will be suitably eliminated.

The calcium chloride solution, which is derived by filter-pressing the material resulting from the treatment of the zinc chloride with calcium hydroxide in the presence of calcium chloride, is available for the formation of the hydrochloric acid or for return to various stages in this process, as indicated on the drawing. The excess of calcium chloride which is not used directly in the aqueous bath process steps may be evaporated to dryness and fused and then broken up into lump form, after which it is placed in a tower and treated with sulfuric acid or heated with sulfur dioxide, air and steam, thereby forming hydrochloric acid gas and calcium sulfate, as fully described in the patent to Mitchell No. 1,923,324. This gas is conducted to the absorber stage of the process for converting the zinc and iron oxides to chlorides; and consequently the chlorine content of the calcium chloride reagent employed in this process is fully used in a cyclic manner for recovering zinc from an ore material. It will also be appreciated that the solution containing calcium chloride has been employed in the place of water to leach the finisher product so as to provide a strong concentration of chloride ions for use during the precipitation of the zinc hydroxide. Also, the calcium or other alkaline earth metal chloride serves initially for forming zinc chloride from the zinc sulfate leached from the ore. Hence, the alkaline earth metal is a primary reagent during many of the stages of this process, and the introduction of other ions into solution is avoided. The substitution of barium and strontium compounds for those of calcium may be carried out at any desired stage in the process. For example, barium or strontium hydroxide may be used to precipitate the zinc hydroxide, and if desired one alkaline earth metal may be used at one stage and another at a different stage in the process. These three elements are to be considered as full equivalents in this process. It is also to be noted that the term "sulfuric acid" in the claims is to be interpreted broadly so as to cover the variations in the process herein described. For example, it is intended to cover either the acid in solution as employed for leaching the roasted ore prior to treatment with calcium chloride or the sulfur oxygen gases employed with a catalytic agent to provide the sulfate radical which in turn combines with calcium chloride and provides a chloridizing agent, such as iron chloride, for converting the zinc compounds of the roasted ore directly to a chloride. In either case, the net result is the production of zinc chloride from a roasted zinc ore by the use of the sulfate radical and alkaline earth metal chloride.

Having thus described our invention, what we claim as new and desire to secure by Letters Patent is:

1. The method of treating a zinc sulfide ore comprising the steps of roasting the ore to form a zinc-oxygen compound, dissolving said compound from the ore and producing a dilute solution containing zinc chloride, separating the solution from the ore residue, chloridizing the residual zinc compounds in the ore residue in a substantially dry condition, and thereafter leaching the zinc chloride from the ore residue by means of said dilute zinc chloride solution and thereby obtaining a solution of zinc chloride of high concentration.

2. The method of treating a zinc sulfide ore comprising the steps of roasting the ore to form a zinc oxygen compound, treating the roasted ore material with sulfuric acid and alkaline earth metal chloride to produce a dilute solution containing zinc and alkaline earth metal chlorides, chloridizing the ore residue to produce zinc chloride from the residual zinc compounds therein, and then leaching the ore residue with said solution, thereby obtaining a solution having a high concentration of zinc chloride.

3. The method of claim 2 in which zinc hydroxide is formed from the final solution of zinc chloride by treatment with alkaline earth metal hydroxide, which is brought to a pulp of suitable consistency for the reaction by the solution of alkaline earth metal chloride serving as a diluent for the zinc chloride solution.

4. The method of treating a zinc sulfide ore comprising the steps of roasting the ore to form a zinc oxygen compound, removing said compound from the roasted ore as a dilute solution containing zinc and alkaline earth metal chlorides, chloridizing the residual zinc compounds in the ore in a substantially dry condition and carrying on the process in the presence of alkaline earth metal chloride which is present in amount sufficient to fix all of the available sulfate radical as a sulfate, thereby producing zinc chloride free from its sulfate, and thereafter leaching the ore residue with said dilute solution to form a solution having a high concentration of zinc chloride.

5. The method of making zinc hydroxide from a strong solution of zinc chloride comprising the steps of treating said solution with alkaline earth metal hydroxide in the condition of a pulp but insufficient in amount to react with all of the zinc chloride, said solution initially containing alkaline earth metal chloride in quantity sufficient to provide a high concentration of chlorine ions and to render the hydroxide capable of being easily penetrated by the zinc chloride, agitating the mass and causing substantially all of the alkaline earth metal hydroxide to react and produce zinc hydroxide together with a small amount of zinc hydroxychloride, and thereafter separating the chloride content of the precipitate from the zinc hydroxide.

6. The method of precipitating zinc hydroxide from a strong zinc chloride solution according to claim 5 in which calcium hydroxide is employed as a thick pulp and the zinc chloride solution contains calcium chloride in such concentration that the pulp may be efficiently stirred and the zinc chloride solution caused to contact and react with all of the calcium hydroxide, the zinc chloride being maintained in excess for the purpose, whereby a product substantially free from calcium hydroxide is obtained.

7. The method of making zinc oxide from zinc hydrate containing zinc hydroxy-chloride comprising the steps of treating the latter intimately with a dilute solution of sodium carbonate, and thereby converting the chloride to a carbonate and forming sodium chloride and thus removing the chloride content as a soluble salt, thereafter filtering the solution from the residue and heating the residue to convert the mixture of zinc hydroxide and carbonate to zinc oxide.

8. The method of making zinc hydroxide comprising the steps of mixing a solution of zinc chloride in excess with alkaline earth metal hydroxide, thereby producing a pulp containing zinc hydroxide, separating the solution from the pulp and treating the solution with alkaline earth metal hydroxide in excess to precipitate the remainder of the zinc in solution, and returning the precipitate with its excess of alkaline earth metal hydroxide to the first stage of this process for use therein.

9. The method of treating a roasted zinc sulfide ore by a process in which alkaline earth metal compounds are primary reagents, comprising the steps of treating a part of the zinc content of the roasted ore with sulfuric acid and alkaline earth metal chloride, thereby removing the sulfate radical as an insoluble alkaline earth metal sulfate and forming zinc chloride in solution, separating the solution from the ore residue, concentrating said solution by adding zinc chloride thereto, treating said solution with alkaline earth metal hydroxide to precipitate zinc hydroxide and separating the chloride solution therefrom, recovering alkaline earth metal chloride from said chloride solution, treating it with sulfuric acid to form hydrochloric acid gas, treating a residual zinc compound in the residue with a chloridizing reagent comprising said hydrochloric acid gas to form a further amount of zinc chloride and employing the zinc chloride in the residue in said concentrating step.

10. In the method of treating an ore containing zinc sulfide according to claim 2, the additional steps of treating the resultant solution of zinc and alkaline earth metal chlorides with a pulp of alkaline earth metal hydroxide, with the zinc chloride in excess of that amount required to react with all of said hydroxide, to precipitate zinc hydroxide, separating the solution of zinc and alkaline earth metal chlorides from the precipitate, and thereafter recovering the zinc from the solution.

11. The method of making zinc oxide comprising the steps of treating zinc chloride in solution with alkaline earth metal hydroxide, the zinc chloride being in excess of that amount required to react with all of said hydroxide, and forming a precipitate of zinc hydroxide and zinc hydroxychloride which is substantially free from alkaline earth metal hydroxide, separating the precipitate from the solution and treating the precipitate with a solution of alkali metal carbonate to form a precipitate of zinc carbonate and a solution of alkali metal chloride by reaction with the combined chlorine of said hydroxychloride, separating the solution from the pulp and thereby forming a chloride free product containing zinc hydroxide and zinc carbonate, and heating this product to form zinc oxide therefrom.

12. The method of making a zinc carbonate comprising the steps of treating a solution of zinc chloride with alkaline earth metal hydroxide, with the zinc chloride in excess of that amount required to react with all the hydroxide, to precipitate zinc hydroxide and zinc hydroxychloride, separating the solution from the precipitate, treating the latter with a carbonating reagent which will convert the chloride content to zinc carbonate, and washing and drying the product.

13. The method of claim 12 in which the final product is heated to convert the zinc hydroxide and zinc carbonate to zinc oxide.

14. The method of treating a zinc sulfide ore according to claim 1 comprising the steps of chloridizing a portion of the zinc content of the ore by reagents including an alkaline earth metal chloride, some of which remains with the zinc chloride, and thereby providing a solution containing said chlorides, precipitating zinc hydroxide from said solution by means of the hydroxide of said alkaline earth metal, separating the alkaline earth metal chloride from the precipitate and returning the former for effecting the chloridization of more of the zinc content of the ore.

15. The method of treating a roasted zinc sulfide ore comprising the steps of chloridizing a portion of the zinc content thereof and forming a zinc chloride solution by means of reagents including an alkaline earth metal chloride, some of which remains in the zinc chloride solution, thereafter treating the combined solution according to the procedure of claim 5, separating the resultant alkaline earth metal chloride solution from the precipitate and returning the former for re-use in the chloridizing stage of the process.

16. The method of treating a roasted zinc sulfide ore comprising the steps of converting a portion of the zinc content thereof to zinc chloride by reagents including an alkaline earth metal chloride, providing a strong solution containing said zinc chloride and a considerable amount of the alkaline earth metal chloride, treating said solution with the hydroxide of said alkaline earth metal which is insufficient in amount to react with all of the zinc chloride and thereby forming a precipitate containing zinc hydroxide which is substantially free from said alkaline earth metal, separating from the precipitate the resultant strong solution of alkaline earth metal chloride, recovering the latter and returning it to the first stage of the process.

17. The method of making zinc oxide according to claim 12 in which the alkaline earth metal hydroxide is in the condition of a pulp and the zinc chloride solution treated therewith initially contains a considerable quantity of alkaline earth metal chloride, after which the precipitate is calcined to form zinc oxide.

ROYAL L. SESSIONS.
THOMAS A. MITCHELL.